United States Patent [19]

Emmons

[11] 4,141,630
[45] Feb. 27, 1979

[54] BICYCLE

[76] Inventor: Conant H. Emmons, 707 N. Main St., Mount Airy, Md. 21771

[21] Appl. No.: 761,136

[22] Filed: Jan. 21, 1977

Related U.S. Application Data

[63] Continuation of Ser. No. 604,126, Aug. 13, 1975, abandoned.

[51] Int. Cl.² ............................................. G03B 29/00
[52] U.S. Cl. ..................................... 352/132; 352/121; 352/166; 272/18
[58] Field of Search ................ 352/131, 132, 121, 39, 352/179, 166; 272/18, 72, 73

[56] References Cited

U.S. PATENT DOCUMENTS 2,679,186  5/1954  Schulte ................................. 352/179

FOREIGN PATENT DOCUMENTS 1930037 12/1970 Fed. Rep. of Germany ............. 272/18

Primary Examiner—Monroe H. Hayes
Attorney, Agent, or Firm—Ulle C. Linton

[57] ABSTRACT

An arrangement for producing or showing distance lapse motion pictures in coordination with a bicycle through mechanical or electrical system operated in accordance with the speed at which the bicycle or exercise bicycle by a user thereof.

3 Claims, 8 Drawing Figures

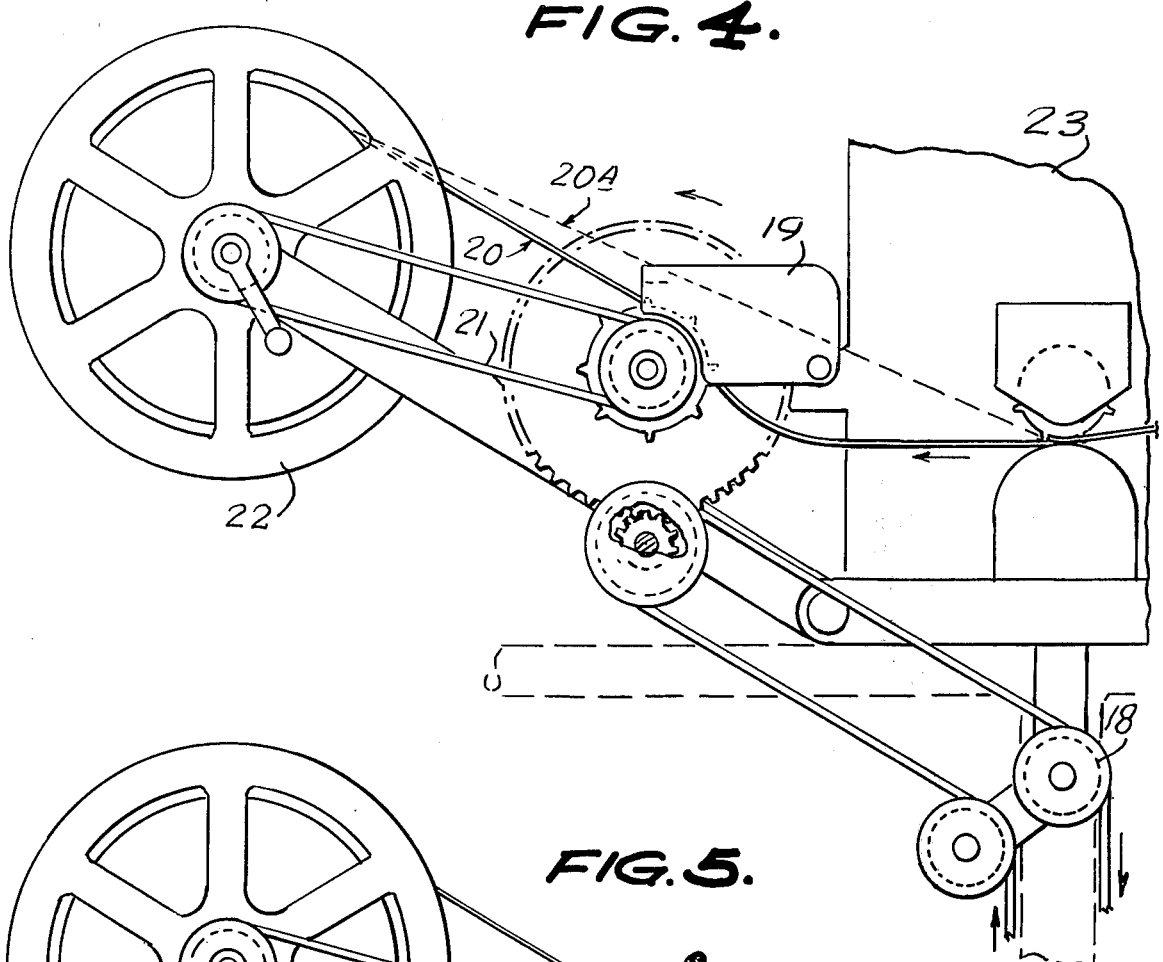
FIG. 4.
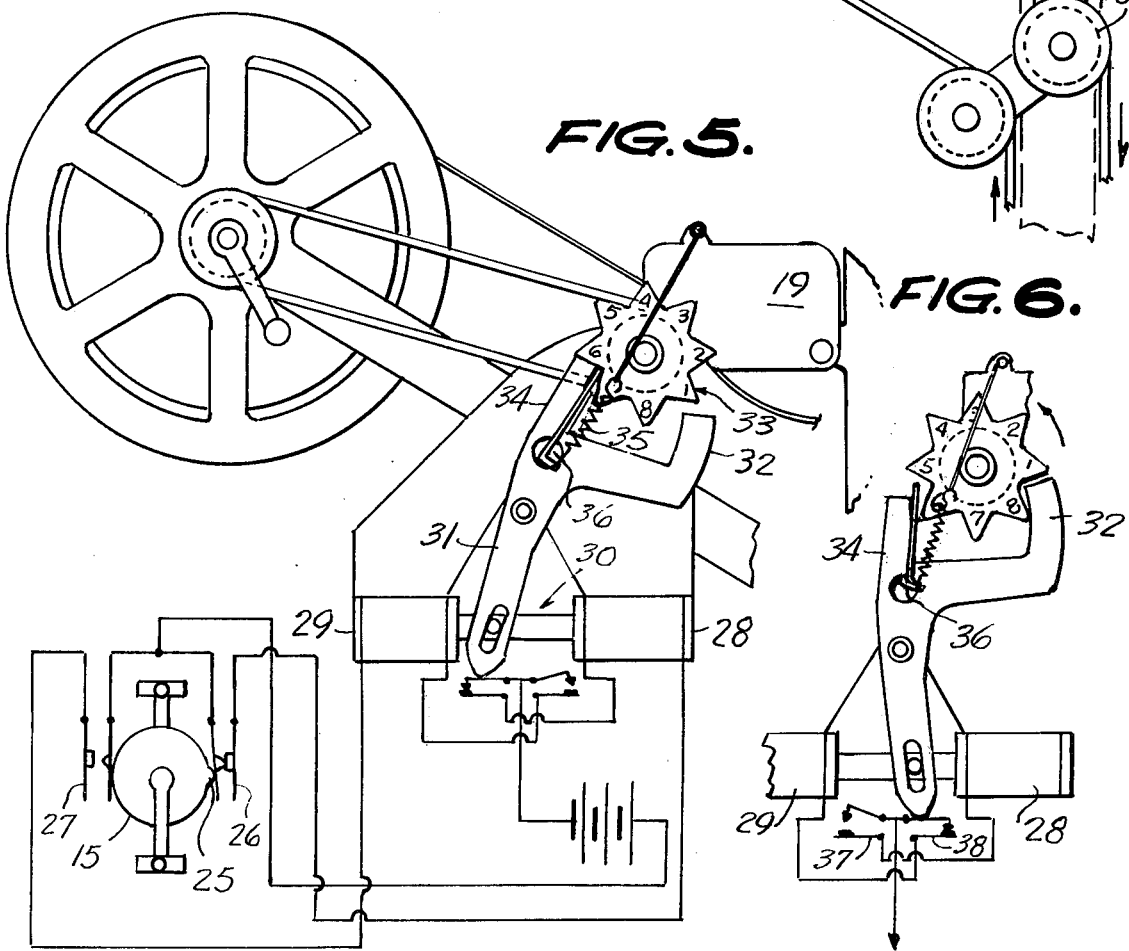
FIG. 5.
FIG. 6.

BICYCLE

This is a continuation of Ser. No. 604,126 filed Aug. 13, 1975, now abandoned.

DESCRIPTION OF THE PRIOR ART

The following U.S. Patents are of interest relative to the present invention:

U.S. Pat. No. 1,525,728 of Feb. 3, 1925
U.S. Pat. No. 2,373,313 of Apr. 10, 1945
U.S. Pat. No. 2,504,007 of Apr. 11, 1950
U.S. Pat. No. 2,788,211 of Apr. 9, 1957
U.S. Pat. No. 3,078,093 of Feb. 19, 1963
U.S. Pat. No. 3,408,067 of Oct. 29, 1968
U.S. Pat. No. 3,583,392 of June 8, 1971

SUMMARY OF THE INVENTION

This invention relates to a motion picture camera mounted on a bicycle with a single frame shutter controlled by the travel of the bicycle to produce distance lapse motion pictures. Also to control the speed of projecting said film by pedaling an exercise bicycle.

The object of the present invention is to produce motion pictures in which each succeeding frame is exposed after the camera has moved forward a definite distance from the previous exposure. This can be accomplished through a trip mechanism on the wheel of the bicycle, or other vehicle, transporting the camera. The resulting film gives the effect of riding through the scene at a constant forward speed, regardless of the variation in time between exposure when the film was made, for example delays due to traffic, pedesterians, or sharp turns.

Another object is to further increase the realism of the optical illusion of riding a bicycle by pedalling an exercise bicycle which controls the projector. When the exerciser stops pedalling, the picture stops. When he pedals faster, then his forward speed into the scene increases.

A further object is to employ the system in walking exercisers, such as treadmills.

Still another object is to simulate moving over water, in relation to rowing machines.

The same could employ film slides taken in sequence.

Distance-lapse-photography could further be used on a highway or transit system to study the area it passed through. Permanent records could be made during the transportation of heavy reactors, generators and space rockets, with a minimum use of film.

DESCRIPTION OF THE PREFERRED EMBODIMENTS

One frame per half a revolution of a 26" bicycle wheel will allow approximately three miles travel to expose a roll of film of 50 ft. or 8 mm, or 100 ft. of 16 mm. Greater or less distances between frames can be chosen according to the photographic detail required along the travel route.

The invention has been reduced to practice on a bicycle with a cam, mechanically triggering the single frame shutter of an 8 mm movie camera.

An exercise bicycle has been modified to mechanically drive a projector-viewer.

Electrical, camera and projector drives can be employed and a circuit for the projector control is shown, and a model has been built.

BRIEF DESCRIPTION OF THE DRAWINGS

Other details and characteristics of the invention will be clearly understood by the description of the accompanying drawings which illustrate non-limiting examples of particular embodiments of the arrangement according to the invention.

FIG. 4 is a partial front view of a film operated by a belt drive.

FIG. 5 is a schematic view of a film viewer operated electrically.

FIG. 6 is a detail view of a portion of the film viewer of FIG. 5 showing the rotation of the gear and relative position of the fork arm.

FIGS. 1–4 show an exercise bicycle 14 has a pedal crank assembly 15 that drives belt wheel 16 and belt 17 which runs through idler pulley 18 to the projector film drive 19. This pulls the film 20 one frame for each half revolution of the pedal crank 15. The film moves through the projector 23 and a picture is seen on the view screen 24, as the operator sits and pedals the exercise bicycle 14. A takeup reel 22 that varies in speed from film drive 19 due to film build up on said reel, connected by a belt that can slip to accommodate said speed variation between 19 and 22. The film can be rewound rapidly while in the viewer, by letting it rest on top of the film advance 19 as in path 20A.

Figure 1:
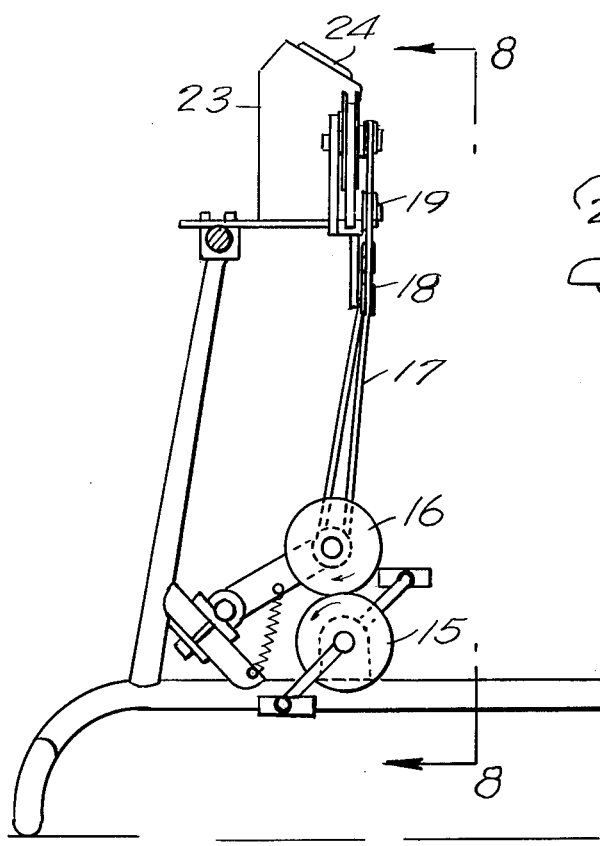
FIG. 1 is a side view of a film viewer on an exercise bicycle with a mechanical belt drive.
Figure 2:
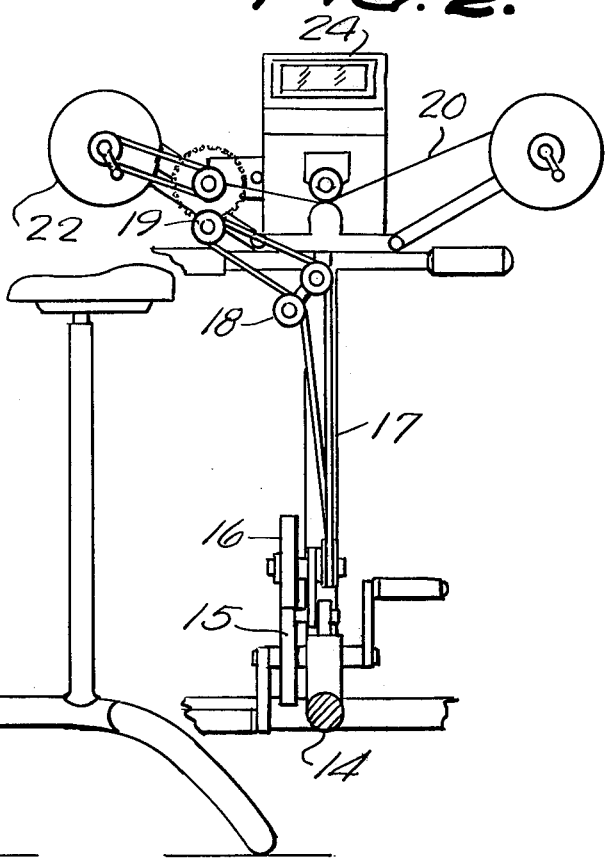
FIG. 2 is a front view of a film viewer on an exercise bicycle, operated mechanically by a belt drive.
Figure 3:
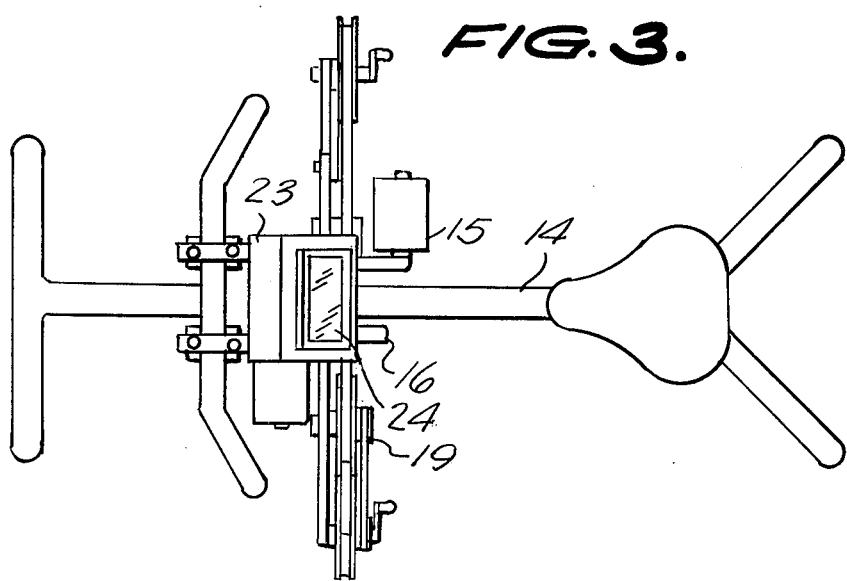
FIG. 3 is a top view of a film viewer on an exercise bicycle, operated mechanicall by a belt drive.

The projector-viewer as shown in FIGS. 5 and 6 may also be operated electrically from said pedal crank assembly 15 with a projection 25 to close switches 26 and 27 alternately supplying voltage to solenoids' 28 and 29 thus causing iron core 30 to move back and forth. Said core 30 is pinned to the drive arm on drive fork 31. In operation: pedal crank projection 25 closes switch 26 activating solenoid 28 pulling in iron core plunger 30 which moves arm 31 to right so that drive fork arm 32 travels upward rotating a sixteen tooth film sprocket drive gear 22½ degrees to advance one frame of film. This gear 33 stops after 1/16 of a revolution when tooth #8 stops on the side of fork arm 32 and tooth #6 is beside fork arm 34. Spring 35 pulls pin 36 so that it extends past the end of the fork arm 34. At the time arm 31 moves to the right it opens switch 37 in solenoid 28 circuit and closes switch 38 in solenoid 29 circuit, so that it can operate when pedal crank 15 closes switch 27. When solenoid 29 is activated and iron core plunger 30 moves arm 31 1/16 revolution until tooth 5 stops on the end of fork arm 34 after driving pin 36 back into arm 34. Tooth #8 is now in position for the cycle to repeat, when switch 26 is next closed by pedal crank 15.

Two solenoids 28 and 29, are employed so that the pedal has to be cranked half a revolution forward or backward to operate the film advance for each frame. Switches 37 and 38 are used to protect the escapment solenoids from possible damage in case the pdeal stops with either switch 26 or 27 closed.

The above electrical drive can be replaced by a mechanical linkage to move escapment fork 31 back and forth, where a crank or cam on pedal crank 15 has been added. This mechanical system has been reduced to practice.

Figure 7:
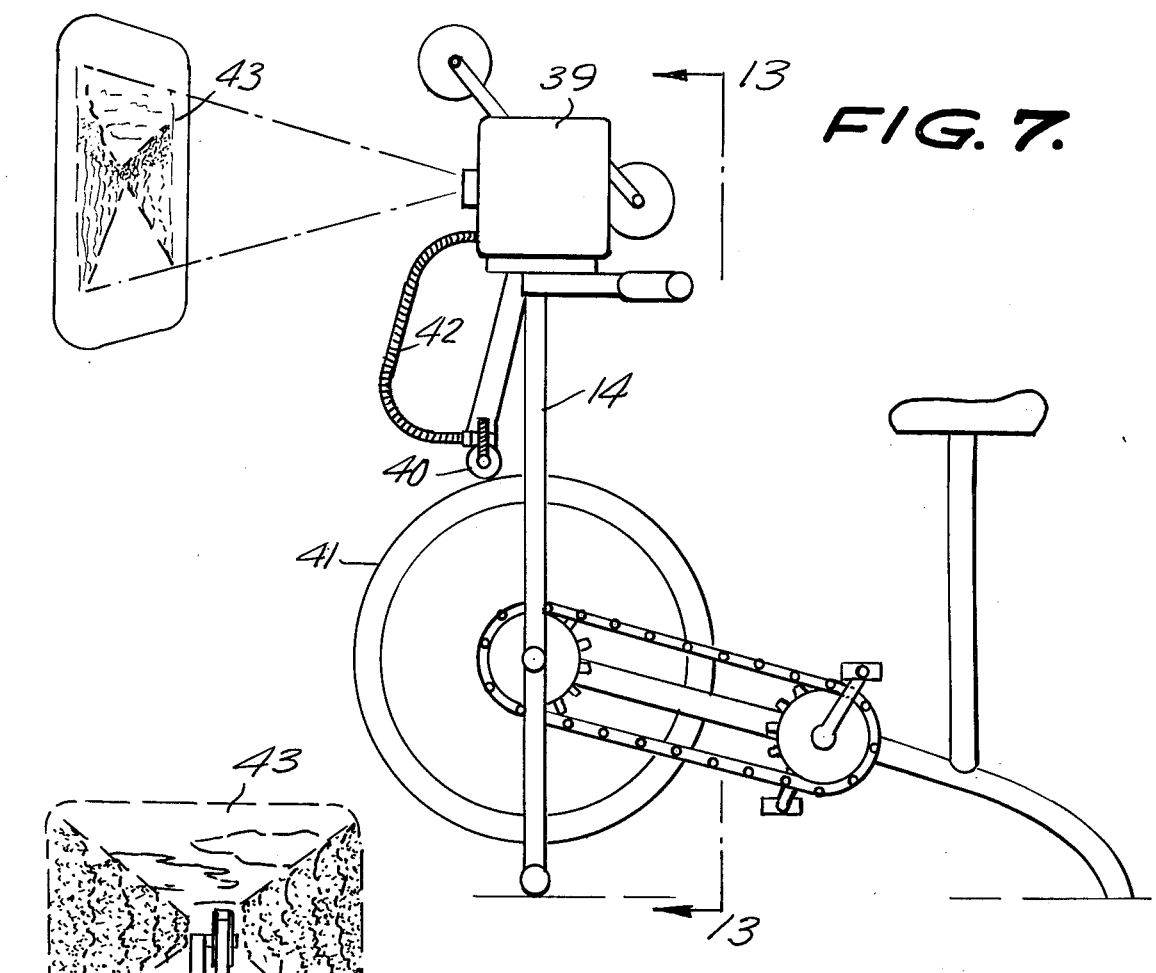
FIG. 7 is a side view of a cable driven detachable projector on a chain drive exercise bicycle.
Figure 8:
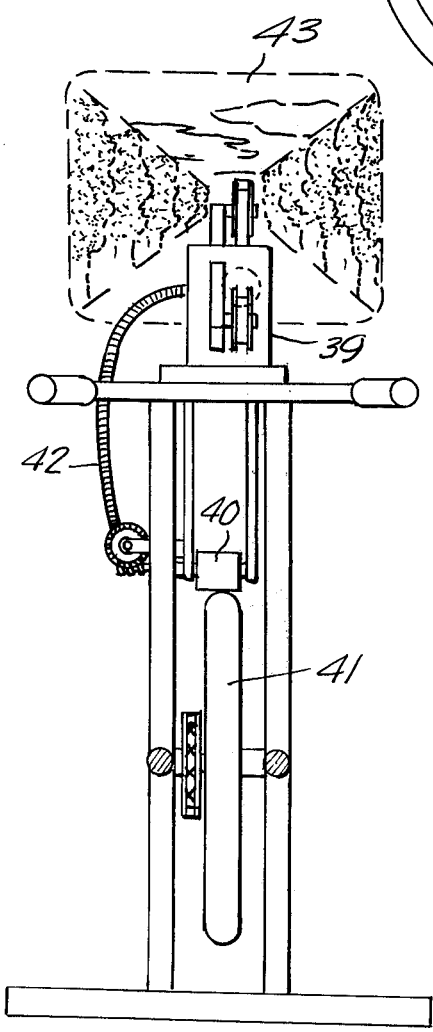
FIG. 8 is a front view of a detachable film projector on a chain drive exercise bicycle.

FIGS. 7 and 8 refer to a small motion picture projector 39 mounted on an exercise bicycle and is driven by a roller 40 resting on tire wheel 41 through a flexible drive cable 42 with picture 43 showing on a screen or wall. Gear drive from roller to drive cable would advance two frames of film for each revolution of the wheel.

The term "bicycle" as used herein indicates a conventional bicycle or exercise bibycle.

It is to be understood that any of the mechanical drives or electrical drive shown can be employed to move the film through the viewer or projector at a rate controlled by pedaling the exercise bicycle.

I claim:

1. A photographic device for showing distance lapse motion pictures comprising an exercise bicycle having a driven wheel, a projector being mounted adjacent said exercise bicycle, having a film transport for moving a single frame of film in said projector and mechanical means connecting said driven wheel to said film transport and capable of moving said film a frame at a time in coordination with the rotation of said driven wheel, consisting of a cam being connected to said driven wheel, a driving fork being operatively connected to said cam for being moved back and forth, a gear being connected to said film transport and operatively connected to said driving fork, a spring loaded pin capable of preventing said gear from slipping back when said teeth are disengaged, whereby said pin in one prong will disengage said gear teeth as said gear is rotated by engaging a second prong of said fork.

2. A photographic device for showing distance lapse motion pictures comprising an exercise bicycle having a driven wheel, a projector being mounted adjacent said exercise bicycle, having a film transport for moving a single frame of film in said projector and mechanical means connecting said driven wheel capable of moving said film a frame at a time in coordination with the rotation of said driven wheel, consisting of a crank connected to said driven wheel, a driving fork operatively connected to said crank for being moved back and forth, a gear being connected to said film transport and operatively connected to said driving fork, a spring loaded pin capable of preventing said gear from slipping back when said teeth are disengaged, whereby said pin in one prong disengages said gear teeth as said gear is being rotated by engaging a second prong of said fork.

3. A photographic device for showing distance lapse motion pictures comprising an exercise bicycle having a driven wheel, a projector being mounted adjacent said exercise bicycle, having a film transport for moving a single frame of film in said projector and electrical means connecting said film transport to said driven wheel capable of moving said film a frame at a time in coordination with the rotation of said driven wheel, consisting of a cam being connected to said driven wheel, a pair of electric switches being operatively connected to said cam for being alternately closed, a pair of solenoids each being electrically connected to one of said switches for being activated by said switches, a common iron core operatively mounted in said solenoids for being driven back and forth, and a pivotally mounted driving fork being operatively connected to said iron core, a gear being connected to said film drive and operatively connected to said driving fork, a spring loaded pin being positioned for preventing said gear from slipping back when said teeth are disengaged, whereby said pin in one prong of said fork is pushed out by said spring behind said pin when said prong disengages said gear teeth and said pin is pushed back into said prong by the lower teeth as said gear is being rotated by engaging a second prong of said fork, a pair of switches being operatively connected to said fork and capable of disconnecting said solenoids from each one of said cam switches at the end of the travel of said core, connecting an unactivated one of said solenoids from the other cam switch, whereby said solenoid circuits open after the moving of said iron core, in event said driven wheel stops rotating with said switch closed.

* * * * *